(12) United States Patent
Kanda et al.

(10) Patent No.: US 10,889,091 B2
(45) Date of Patent: Jan. 12, 2021

(54) LAMINATED GLASS

(71) Applicant: ZEON CORPORATION, Tokyo (JP)

(72) Inventors: Hideyuki Kanda, Tokyo (JP); Atsushi Ishiguro, Tokyo (JP); Teiji Kohara, Tokyo (JP)

(73) Assignee: ZEON CORPORATION, Tokyo (JP)

(*) Notice: Subject to any disclaimer, the term of this patent is extended or adjusted under 35 U.S.C. 154(b) by 53 days.

(21) Appl. No.: 15/567,079

(22) PCT Filed: Apr. 14, 2016

(86) PCT No.: PCT/JP2016/062020
§ 371 (c)(1),
(2) Date: Oct. 17, 2017

(87) PCT Pub. No.: WO2016/171068
PCT Pub. Date: Oct. 27, 2016

(65) Prior Publication Data
US 2018/0099486 A1  Apr. 12, 2018

(30) Foreign Application Priority Data

Apr. 22, 2015 (JP) ................. 2015-087568

(51) Int. Cl.
*B32B 17/10* (2006.01)
*B32B 27/08* (2006.01)

(52) U.S. Cl.
CPC ........ *B32B 27/08* (2013.01); *B32B 2307/102* (2013.01); *B32B 2307/306* (2013.01); *B32B 2307/51* (2013.01); *B32B 2307/558* (2013.01); *B32B 2307/718* (2013.01); *B32B 2307/7265* (2013.01)

(58) Field of Classification Search
CPC . B23D 25/06; Y10T 83/4737; Y10T 83/4751; B32B 17/10036; B32B 17/1055; B32B 2307/102; B32B 2307/306; B32B 2307/51; B32B 2307/558; B32B 2307/718; B32B 2307/7265; C08C 19/02; C08C 19/25; C08F 297/04; C08F 8/04; C08F 8/42
See application file for complete search history.

(56) References Cited

U.S. PATENT DOCUMENTS

| | | |
|---|---|---|
| 6,265,054 B1 | 7/2001 | Bravet et al. |
| 2002/0150744 A1 | 10/2002 | Nagai |
| 2004/0157048 A1 | 8/2004 | Nagai |
| 2004/0260028 A1 | 12/2004 | Sone |
| 2013/0008506 A1 | 1/2013 | Tanahashi et al. |
| 2015/0104654 A1* | 4/2015 | Kohara ............ C08F 8/42 428/429 |

FOREIGN PATENT DOCUMENTS

| | | |
|---|---|---|
| EP | 2623526 A1 | 8/2013 |
| JP | H111349 A | 1/1999 |
| JP | 2002326847 A | 11/2002 |
| WO | 2003018656 A1 | 3/2003 |
| WO | 2011096389 A1 | 8/2011 |
| WO | 2012043708 A1 | 4/2012 |
| WO | 2013176258 A1 | 11/2013 |
| WO | WO 2013/176258 | * 11/2013 |

OTHER PUBLICATIONS

Quartz Glass NPL document retrieved Jun. 13, 2019.*

* cited by examiner

*Primary Examiner* — Michael B Nelson
(74) *Attorney, Agent, or Firm* — Kenja IP Law PC

(57) ABSTRACT

The present invention is a laminated glass which is prepared by inserting a resin intermediate film between glass plates and adhering the glass plates to integrate them, having a bending deflection at 90° C. is 7.3 N/mm² or higher, a weight per unit area is 7.5 kg/m² or less,
wherein the resin intermediate film contains a modified hydrogenated block copolymer [E] obtained by introducing an alkoxysilyl group into a hydrogenated block copolymer [D],
storage elastic moduli in the dynamic viscoelastic properties of the resin intermediate film are 5×10⁸ Pa or lower at a temperature of −20° C. and 2×10⁷ Pa or higher at a temperature of 90° C., and
the hydrogenated block copolymer [D] is obtained by hydrogenating 90% or more of carbon-carbon unsaturated bonds on a main chain and side chains and carbon-carbon unsaturated bonds on an aromatic ring in a specific block copolymer [C].

3 Claims, No Drawings

LAMINATED GLASS

TECHNICAL FIELD

The present invention relates to a lightweight laminated glass, and more specifically to a laminated glass which maintains properties such as rigidity, impact resistance and heat resistance and has lightweightness.

BACKGROUND ART

Weight reducing for an automobile is a technique useful for environmental protection by lower fuel consumption. For example, it is attempted to reduce the weight by replacement of a part of a metal component with a plastic, use of a window material including a transparent plastic such as a polycarbonate instead of a glass, or the like.

However, since a thickness of a transparent plastic plate has to be increased in order to maintain the rigidity equivalent to that of glass, the weight has not been reduced as low as expected. In addition, a hard coat layer should be installed in order to provide scratch resistance, thus there are problems such as high cost, and its popularization has not progressed.

As a countermeasure for this problem, Patent Literature 1 discloses that a thickness of a glass plate is decreased and a thickness of a resin intermediate film is increased by using a resin intermediate film including a resin having a Young's modulus equal to or higher than a specific value, so that a bending rigidity equal to that of a glass plate can be maintained to obtain a laminated glass lighter than a glass plate. For example, it is indicated that a laminated glass using a resin intermediate film including a polyethylene ionomer can be lightened compared to a glass by 34% and a laminated glass using a resin intermediate film including polycarbonate can be lightened by 27%.

In addition, in this literature, examples of a specific material constituting a resin intermediate film which can be lightened compared to a glass plate alone, include polyethylene ionomer, polycarbonate, polyurethane, polyethylene terephthalate, acrylic resin and the like. Furthermore, this document also indicates that a laminated glass which is lightened compared to a glass plate alone while maintaining a certain bending rigidity, cannot be obtained from a resin intermediate film using a polyvinyl butyral resin.

However, although the window material for automobiles using the lightweight laminated glass using the intermediate film including the resin exemplified above could maintain a certain bending rigidity, it did not also meet properties such as impact resistance (under conditions at temperatures of 40° C. and −20° C.), heat resistance, light resistance and moisture resistance e.g. as defined in a standard for automotive safety glass JIS R3211.

In addition, Patent Literature 2 discloses a laminated glass using a resin intermediate film including an ethylene/vinyl acetate copolymer (EVA) and/or a polyvinyl butyral (PVB) and a thin glass, having a surface density of 8.8 kg/m$^2$, sound insulation property and heat insulation property.

However, this literature describes only a laminated glass prepared by thinning the glass to reduce the surface density compared to a glass in Comparative Example by about 30%, and does not describe e.g. decrease of bending rigidity.

CITATION LIST

Patent Literature

Patent Literature 1: JP-A-11-001349 (U.S. Pat. No. 6,265,054 B1)

Patent Literature 2: JP-A-2002-326847 (US 2002/0,150,774 A1, US 2004/0,157,048 A1)

SUMMARY OF INVENTION

Technical Problem

The present invention has been made in view of the above circumstances, and the object of the present invention is to provide a laminated glass, which is excellent in heat resistance, impact resistance, moisture resistance and the like while maintaining rigidity and reducing the weight per unit area and is useful as a window material for automobiles, ships, aircrafts, buildings and the like.

Solution to Problem

In order to solve the above-described problems, the present inventors proceeded intensive studies. As a result, the inventors have found that a lightweight laminated glass, which maintains impact resistance at a low temperature (e.g. −20° C.) and rigidity at a high temperature (e.g. 90° C.) and is useful as an automotive window material, can be obtained by using a resin intermediate film containing a particular modified hydrogenated block copolymer and appropriately selecting the thicknesses of the glass and the resin intermediate film, and have completed the present invention.

Thus, one aspect of the invention provides a laminated glass which is prepared by inserting a resin intermediate film between glass plates and adhering the glass plates to integrate them, having a bending deflection at 90° C. is 7.3 N/mm$^2$ or higher, a weight per unit area is 7.5 kg/m$^2$ or less, wherein the resin intermediate film contains a modified hydrogenated block copolymer [E] obtained by introducing an alkoxysilyl group into a hydrogenated block copolymer [D], storage elastic moduli in the dynamic viscoelastic properties of the resin intermediate film are 5×10$^8$ Pa or lower at a temperature of −20° C. and 2×10$^7$ Pa or higher at a temperature of 90° C., and the hydrogenated block copolymer [D] is obtained by hydrogenating 90% or more of carbon-carbon unsaturated bonds on a main chain and side chains and carbon-carbon unsaturated bonds on an aromatic ring in a block copolymer [C] which is containing at least two polymer blocks [A] mainly containing a structural unit derived from an aromatic vinyl compound and at least one polymer block [B] mainly containing a structural unit derived from an acyclic conjugated diene compound.

Advantageous Effects of Invention

One aspect of the invention provides a laminated glass which is excellent in heat resistance, impact resistance, light resistance, moisture resistance and the like while maintaining high rigidity and reducing the weight per unit area compared to a general laminated glass, and is useful as a window material for automobiles, ships, aircrafts, buildings and the like.

The term rigidity means generally a degree of difficulty in dimensional change (deformation) due to bending and torsional forces, and if the deformation due to force is slight, the rigidity is determined to be high (significant), and if the deformation is significant, the rigidity is determined to be low (slight). The "rigidity" is represented by e.g. a degree of deflection when applying a certain magnitude of bending stress to the laminated glass.

For example, in a case of a laminated glass in which a glass plate having a thickness of 2.1 mm is laminated with an intermediate film including polyvinyl butyral resin having a thickness of 0.76 mm as a general laminated glass, the weight per unit area is 11.3 kg/m$^2$, but one aspect of the invention can reduce the weight per unit area to 7.5 kg/m$^2$ or less (to about ⅔ or less) while maintaining rigidity equal to or higher than that of the exemplified general laminated glass.

DESCRIPTION OF EMBODIMENTS

The laminated glass according to one embodiment of the invention will be described below in detail.

The laminated glass according to one embodiment of the present invention is defined by the followings (i) to (v).

(i) The laminated glass is prepared by inserting a resin intermediate film between glass plates and adhering the glass plates to integrate them.

(ii) The laminated glass has a bending deflection at a temperature of 90° C. of 7.3 N/mm$^2$ or higher.

(iii) The laminated glass has a weight per unit area of 7.5 kg/m$^2$ or less.

(iv) Storage elastic moduli in the dynamic viscoelastic properties of the resin intermediate film are $5 \times 10^8$ Pa or lower at a temperature of −20° C. and $2 \times 10^7$ Pa or higher at a temperature of 90° C.

(v) The resin intermediate film contains a modified hydrogenated block copolymer [E] (hereinafter referred to as "modified hydrogenated block copolymer [E]" in some cases) obtained by introducing an alkoxysilyl group into a hydrogenated block copolymer [D] obtained by hydrogenating 90% or more of carbon-carbon unsaturated bonds on a main chain and side chains and carbon-carbon unsaturated bonds on an aromatic ring in a block copolymer [C] including at least two polymer blocks [A] mainly containing a structural unit derived from an aromatic vinyl compound and at least one polymer block [B] mainly containing a structural unit derived from an acyclic conjugated diene compound.

1. Modified Hydrogenated Block Copolymer [E]

The resin intermediate film used in the laminated glass according to one embodiment of the invention contains a modified hydrogenated block copolymer [E].

The modified hydrogenated block copolymer [E] as a constituent of the resin intermediate film used in the present invention is a polymer prepared by introducing an alkoxysilyl group into a hydrogenated block copolymer [D] obtained by hydrogenating 90% or more of carbon-carbon unsaturated bonds on a main chain and side chains and carbon-carbon unsaturated bonds on an aromatic ring in a block copolymer [C] including at least two polymer blocks [A] mainly containing a structural unit derived from an aromatic vinyl compound and at least one polymer block [B] mainly containing a structural unit derived from an acyclic conjugated diene compound.

The polymer block [A] mainly contains a structural unit derived from an aromatic vinyl compound, and the content of the structural unit derived from the aromatic vinyl compound in the polymer block [A] is normally 95 wt % or more, preferably 97 wt % or more, and more preferably 99 wt % or more.

When the structural unit derived from the aromatic vinyl compound is within the above range, the laminated glass according to one embodiment of the invention is excellent in heat resistance and rigidity at high temperature.

Examples of the aromatic vinyl compound include styrene; styrenes having an alkyl group as a substituent, such as α-methylstyrene, 2-methyl styrene, 3-methyl styrene, 4-methylstyrene, 2,4-diisopropylstyrene, 2,4-dimethyl styrene, 4-t-butyl styrene and 5-t-butyl-2-methylstyrene; styrenes having an alkoxy group as a substituent, such as 4-methoxystyrene and 3-methoxy-5-isopropoxystyrene; styrenes having a halogen atom as a substituent, such as 4-monochlorostyrene, dichlorostyrene and 4-monofluorostyrene; styrenes having an aryl group as a substituent, such as 4-phenylstyrene; and the like. Above all, styrenes containing no polar group e.g. styrene; the styrenes having an alkyl group as a substituent; the styrenes having an aryl group as a substituent; and the like are preferred from the viewpoint of hygroscopicity, and styrene is particularly preferred because it is industrially available with ease.

The polymer block [A] can contain a structural unit derived from an acyclic conjugated diene and/or a structural unit derived from another vinyl compound as a component other than the structural unit derived from the aromatic vinyl compound. Its content is normally 5 wt % or less, preferably 3 wt % or less, and more preferably 1 wt % or less.

If the amount of the structural unit derived from the aromatic vinyl compound in the polymer block [A] is too small, the heat resistance of the laminated glass possibly decreases.

Examples of the acyclic conjugated diene and other vinyl compounds include the same compounds as the acyclic conjugated diene and other vinyl compounds which is a structural unit of the polymer block [B] described below.

The polymer block [B] mainly contains a structural unit derived from an acyclic conjugated diene compound, and the content of the structural unit derived from the acyclic conjugated diene compound in the polymer block [B] is normally 80 wt % or more, preferably 90 wt % or more, and more preferably 95 wt % or more.

When the structural unit derived from the acyclic conjugated diene compound is within the above range, the laminated glass according to one embodiment of the invention is excellent in thermal shock resistance and adhesiveness at low temperature.

As the acyclic conjugated diene-based compound, an acyclic conjugated diene-based compound containing no polar group is preferred from the viewpoint of hygroscopicity. Specifically, it can be exemplified by 1,3-butadiene, isoprene, 2,3-dimethyl-1,3-butadiene, 1,3-pentadiene and the like. Above all, the 1,3-butadiene and isoprene are particularly preferred because they are industrially available with ease.

The polymer block [B] can contain a structural unit derived from an aromatic vinyl compound and/or a structural unit derived from another vinyl compound as a component other than the structural unit derived from the acyclic conjugated diene compound. Its content is normally 20 wt % or less, preferably 10 wt % or less, and more preferably 5 wt % or less.

Examples of other vinyl-based compounds include an acyclic vinyl compound (except for acyclic conjugated diene compound), a cyclic vinyl compound, an unsaturated cyclic acid anhydride, an unsaturated imide compound and the like.

These compounds may have a substituent such as a nitrile group, an alkoxycarbonyl group, a hydroxycarbonyl group and a halogen atom.

Above all, a compound containing no polar group such as: an acyclic olefin having 2 to 20 carbon atoms such as ethylene, propylene, 1-butene, 1-pentene, 1-hexene, 1-heptene, 1-octene, 1-nonene, 1-decene, 1-dodecene, 1-eicosen, 4-methyl-1-pentene and 4,6-dimethyl-1-heptene; a cycloolefin having 5 to 20 carbon atoms such as vinylcyclohexane and norbornene; a cyclodiene compound such as 1,3-cyclohexadiene and norbornadiene is preferred from the viewpoint of hygroscopicity.

The block copolymer [C] is a copolymer in which when a weight fraction of the whole polymer block [A] accounting for the whole block copolymer [C] is defined as wA and a weight fraction of the whole polymer block [B] accounting for the whole block copolymer [C] is defined as wB, the ratio of wA to wB (wA:wB) is 40:60 to 60:40, and preferably 45:55 to 55:45. When the ratio (wA:wB) is within this range, a modified hydrogenated block copolymer [E] having flexibility and moderate heat resistance can be obtained.

In the block copolymer [C], the number of the polymer blocks [A] is normally 3 or less, and preferably 2, and the number of the polymer blocks [B] is normally 2 or less, and preferably 1.

Although the block form of the block copolymer [C] may be a chain type block or a radial type block, the form of the chain type block is preferred because of excellent mechanical strength. The most preferred form for the block copolymer [C] is a [A]-[B]-[A] type triblock copolymer in which the polymer blocks [A] bind to both ends of the polymer block [B].

Each of the plural polymer blocks [A] may be the same as or different from each other. Further, when there is a plurality of polymer blocks [B], each of the polymer blocks [B] may be the same as or different from each other.

The molecular weight of the block copolymer [C] refers to a weight average molecular weight (Mw) in terms of polystyrene determined by gel permeation chromatography (GPC) using tetrahydrofuran (THF) as a solvent, and is normally 40,000 to 200,000, preferably 45,000 to 150,000, and more preferably 50,000 to 100,000.

In addition, the molecular weight distribution (Mw/Mn) of the block copolymer [C] is preferably 3 or less, more preferably 2 or less, and particularly preferably 1.5 or less.

When the Mw and the Mw/Mn are within the above ranges, the modified hydrogenated block copolymer [E] has good heat resistance and mechanical strength, and the heat resistance and the mechanical strength of the laminated glass according to one embodiment of the invention do not decrease.

The method for producing the block copolymer (C) is not particularly limited, and it may be produced in accordance with a known method. For example, it can be produced in accordance with methods described in WO 2003/018656 brochure, WO 2011/096389 brochure and the like.

The hydrogenated block copolymer [D] is a polymer obtained by hydrogenating carbon-carbon unsaturated bonds on the main chain and the side chains and carbon-carbon unsaturated bonds on the aromatic ring in the block copolymer [C]. Its hydrogenation ratio is normally 90% or higher, preferably 97% or higher, and more preferably 99% or higher.

In addition, the hydrogenation ratio of the carbon-carbon unsaturated bonds on the main chain and the side chains of the block copolymer [C] is preferably 97% or higher, and more preferably 99% or higher. In addition, the hydrogenation ratio of the carbon-carbon unsaturated bonds on the aromatic ring of the block copolymer [C] is preferably 97% or higher, and more preferably 99% or higher.

The higher the hydrogenation ratio is, the better the light resistance and heat deterioration resistance of the hydrogenated block copolymer (D) used in the present invention are.

The hydrogenation ratio of the hydrogenated block copolymer [D] can be determined by $^1$H-NMR measurement of the hydrogenated block copolymer (D).

The hydrogenation method, the reaction form and the like of the unsaturated bond in the block copolymer (C) are not particularly limited, and a known method can be adopted. Above all, a hydrogenation method in which the hydrogenation ratio can be increased and the polymer chain-cleaving reaction is reduced, is preferred. Examples of such a hydrogenation method include methods described in e.g. WO 2011/096389 brochure, WO 2012/043708 brochure and the like.

The molecular weight of the hydrogenated block copolymer [D] refers to a weight average molecular weight (Mw) in terms of polystyrene determined by GPC using THF as a solvent, and is normally 40,000 to 200,000, preferably 45,000 to 150,000, and more preferably 50,000 to 100,000.

In addition, the molecular weight distribution (Mw/Mn) of the hydrogenated block copolymer [D] is preferably 3 or less, more preferably 2 or less, and particularly preferably 1.5 or less.

When the Mw and the Mw/Mn are within the above range, the modified hydrogenated block copolymer [E] has good heat resistance and mechanical strength, and is preferred because the heat resistance and the mechanical strength of the laminated glass according to one embodiment of the invention do not decrease.

In the modified hydrogenated block copolymer [E], an alkoxysilyl group is introduced into the hydrogenated block copolymer [D].

The alkoxysilyl group is introduced into the hydrogenated block copolymer [D], so that strong adhesiveness with glass can be provided.

Examples of the alkoxysilyl group include a tri(alkoxy having 1 to 6 carbon atoms)silyl group such as a trimethoxysilyl group and a triethoxysilyl group; a (alkyl having 1 to 20 carbon atoms)di(alkoxy having 1 to 6 carbon atoms)silyl group such as a methyldimethoxysilyl group and a methyldiethoxysilyl group, an ethyldimethoxysilyl group, an ethyldiethoxysilyl group, a propyldimethoxysilyl group, a propyldiethoxysilyl group; an (aryl)di(alkoxy having 1 to 6 carbon atoms)silyl group such as a phenyldimethoxysilyl group and a phenyldiethoxysilyl group; and the like.

In addition, the alkoxysilyl group may be bound to the hydrogenated block copolymer [D] through a divalent organic group such as an alkylene group having 1 to 20 carbon atoms and an alkyleneoxycarbonylalkylene group having 2 to 20 carbon atoms.

The amount of the alkoxysilyl group introduced into the hydrogenated block copolymer [D] is normally 0.1 to 10 parts by weight, preferably from 0.2 to 5 parts by weight, and more preferably 0.5 to 3 parts by weight based on 100 parts by weight of the hydrogenated block copolymer [D].

If the amount of the introduced alkoxysilyl group is too large, crosslinking of the alkoxysilyl groups decomposed by a tiny amount of water or the like proceeds during preservation of the resulting modified hydrogenated block copolymer [E], and thus there is a possibility that gelation occurs, a temperature required for melt extrusion of the resin intermediate film is raised due to decreased flowability during melt forming, or a surface of the resin intermediate film to be formed gets rough. In addition, if the amount of the introduced alkoxysilyl group is too small, the adhesiveness of the formed resin intermediate film with the glass possibly decreases.

The modified hydrogenated block copolymer [E] can be produced in accordance with a known method. The method can be exemplified by methods described in e.g. WO 2012/043708, WO 2013/176258 and the like.

More specifically, the modified hydrogenated block copolymer [E] can be obtained by reacting an ethylenically unsaturated silane compound with the hydrogenated block copolymer [D] in the presence of an organic peroxide.

The ethylenically unsaturated silane compound to be used is not particularly limited as long as it can graft-polymerize with the hydrogenated block copolymer [D] to introduce an alkoxysilyl group into the hydrogenated block copolymer [D]. For example, vinyltrimethoxysilane, vinyltriethoxysilane, allyltrimethoxysilane, allyltriethoxysilane, dimethoxymethylvinylsilane, diethoxymethylvinylsilane, p-styryltrimethoxysilane, 3-acryloxypropyltrimethoxysilane, 3-acryloxypropyltriethoxysilane, 3-methacryloxypropyltrimethoxysilane, 3-methacryloxypropyltriethoxysilane, 3-methacryloxypropylmethyldimethoxysilane, 3-methacryloxypropylmethyldiethoxysilane, 3-acryloxypropyltrimethoxysilane and the like are suitably used. These ethylenically unsaturated silane compounds may be used either alone or in combination.

The ethylenically unsaturated silane compound is normally used in an amount of 0.1 to 10 parts by weight, preferably 0.2 to 5 parts by weight, and more preferably 0.5 to 3 parts by weight based on 100 parts by weight of the hydrogenated block copolymer [D].

As an organic peroxide to be used, a peroxide having a one-minute half-life temperature of 170 to 190° C. is preferably used.

For example, t-butylcumyl peroxide, dicumyl peroxide, di-t-hexyl peroxide, 2,5-dimethyl-2,5-di(t-butylperoxy)hexane, di-t-butyl peroxide, di(2-t-butylperoxyisopropyl)benzene and the like are suitably used as the organic peroxide.

These peroxides may be used either alone or in combination.

The organic peroxide is normally used in an amount of 0.01 to 1 part by weight, and preferably 0.05 to 0.5 part by weight based on 100 parts by weight of the hydrogenated block copolymer [D].

The molecular weight of the modified hydrogenated block copolymer [E] is substantially the same as the molecular weight of the hydrogenated block copolymer [D] used as a raw material, because the amount of alkoxysilyl group to be introduced is small. On the other hand, since it is reacted with the ethylenically unsaturated silane compound in the presence of a peroxide, the crosslinking reaction and the cleavage reaction of the polymers concurrently occur, and the molecular weight distribution value of the modified hydrogenated block copolymer [E] becomes higher.

The molecular weight of the modified hydrogenated block copolymer [E] refers to a weight average molecular weight (Mw) in terms of polystyrene determined by GPC using THF as a solvent, and is normally 40,000 to 200,000, preferably 45,000 to 150,000, and more preferably 50,000 to 100,000. In addition, its molecular weight distribution (Mw/Mn) is preferably 3.5 or lower, more preferably 2.5 or lower, and particularly preferably 2.0 or lower.

When the Mw and the Mw/Mn are within the above range, the heat resistance and the mechanical strength of the modified hydrogenated block copolymer [E] can be maintained.

2. Resin Intermediate Film

The resin intermediate film used in the present invention contains the modified hydrogenated block copolymer [E]. The content of the modified hydrogenated block copolymer [E] in the resin intermediate film is normally 40 wt % or more, preferably 50 wt % or more, and more preferably 60 wt % or more.

A storage elastic modulus in dynamic viscoelastic properties of the resin intermediate film used in the present invention is $5 \times 10^8$ Pa or lower, preferably $3 \times 10^8$ Pa or lower at −20° C., and $2 \times 10^7$ Pa or higher, preferably $3 \times 10^7$ Pa or higher at 90° C. When the storage elastic modulus of the resin intermediate film is within the above range at −20° C., adhesiveness and impact resistance at low temperature are provided to the laminated glass, and when it is within the above range at 90° C., heat resistance is ensured in the laminated glass and this is advantageous for developing rigidity at a high temperature.

Herein, the storage elastic modulus in the dynamic viscoelastic properties of the resin intermediate film is a value determined by measuring a viscoelastic spectrum under a condition of angular frequency: 1 rad/s, measurement temperature range: −100 to +130° C. and increase rate: 5° C./min in accordance with JIS K7244-2 method (torsion pendulum method) using the test piece cut from the resin intermediate film.

The resin intermediate film may include only a modified hydrogenated block copolymer [E] or a mixture of a modified hydrogenated block copolymer [E] and other resins as a resin component.

For example, when the resin intermediate film does not have the storage elastic modulus, particularly when the storage elastic modulus at 90° C. is lower than the above-described values, in order to increase the storage elastic modulus of the resin intermediate film, the resin intermediate film can be:

a. resin intermediate film including a resin composition obtained by mixing the hydrogenated block copolymer [D] which is a precursor of the modified hydrogenated block copolymer [E] and/or a hydrogenated block copolymer [D'] having a higher storage elastic modulus than of the hydrogenated block copolymer [D] with the modified hydrogenated block copolymer [E]; or b. a multilayer resin intermediate film in which a layer including the modified hydrogenated block copolymer [E], and a layer including the hydrogenated block copolymer [D] which is a precursor of the modified hydrogenated block copolymer [E] and/or the hydrogenated block copolymer [D'] are alternately laminated; and the like.

In these cases, the hydrogenated block copolymer [D'] preferably has a storage elastic modulus higher than of the hydrogenated block copolymer [D] as the precursor of the modified hydrogenated block copolymer [E] at 90° C.

Similarly to the hydrogenated block copolymer [D] as a precursor of the modified hydrogenated block copolymer [E], the hydrogenated block copolymer [D'] is a polymer obtained by hydrogenating the carbon-carbon unsaturated bonds on the main chain and the side chains and the carbon-carbon unsaturated bonds on the aromatic ring in the block copolymer [C]. Its hydrogenation ratio is normally 90% or higher, preferably 97% or higher, and more preferably 99% or higher.

The hydrogenated block copolymer [D'] is obtained by hydrogenating 90% or more of the carbon-carbon unsaturated bonds on the main chain and the side chains and the carbon-carbon unsaturated bonds on the aromatic ring in the block copolymer [C'] in which when a weight fraction of the whole polymer block [A'] accounting for the whole block copolymer [C'] is defined as wA' and a weight fraction of the whole polymer block [B'] accounting for the whole block copolymer [C'] is defined as wB' in the block copolymer [C']

as a precursor, the ratio of wA' to wB' (wA':wB') is 50:50 to 70:30, and preferably 55:45 to 65:35.

When the ratio (wA':wB') is within this range, the copolymer has excellent compatibility with the modified hydrogenated block copolymer [E], and the mixture with the modified hydrogenated block copolymer [E] is excellent in transparency, and the storage elastic modulus of the resin intermediate film can be increased to a preferable range by mixing or laminating it with the modified hydrogenated block copolymer [E].

The molecular weight of the hydrogenated block copolymer [D'] refers to a weight average molecular weight (Mw) in terms of polystyrene determined by GPC using THF as a solvent, and is normally 40,000 to 200,000, preferably 45,000 to 150,000, and more preferably 50,000 to 100,000. In addition, the molecular weight distribution (Mw/Mn) of the hydrogenated block copolymer [D'] is preferably 3 or less, more preferably 2 or less, and particularly preferably 1.5 or less. When the Mw and the Mw/Mn of the hydrogenated block copolymer [D'] are within the above range, the resin intermediate film used in the present invention has good heat resistance and mechanical strength and is advantageous for maintaining the rigidity at a high temperature region of the laminated glass according to one embodiment of the invention.

As a method for blending the hydrogenated block copolymer [D'] to the modified hydrogenated block copolymer [E], a known method commonly used can be applied. A homogeneously blended modified hydrogenated block copolymer [E] can be produced by e.g. a method in which a pellet of the modified hydrogenated block copolymer [E] and a pellet of the hydrogenated block copolymer [D'] are melt-kneaded by a continuous melt kneader such as a twin-screw extruder, and extruded into a pellet, and the like.

In a case where the hydrogenated block copolymer [D'] is blended into the modified hydrogenated block copolymer [E], the hydrogenated block copolymer [D'] is normally blended in an amount of 60 parts by weight or less, preferably 50 parts by weight or less, and more preferably 40 parts by weight or less based on 100 parts by weight of the modified hydrogenated block copolymer [E]. The hydrogenated block copolymer [D'] is blended in such a ratio, so that a resin intermediate film having a preferable storage elastic modulus can be formed.

In addition to the modified hydrogenated block copolymer [E] and the hydrogenated block copolymer [D'] which constitute the resin intermediate film, various compounding ingredients such as a UV absorber, an antioxidant, a light resistance stabilizer and an infrared-shielding agent can be added to the resin intermediate film. The compounding ingredients such as the UV absorber, the antioxidant, the light resistance stabilizer and the infrared-shielding agent can be used either alone or in combination.

These additives are normally blended in an amount of 5 parts by weight or less, preferably 3 parts by weight or less, and more preferably 2 parts by weight or less based on 100 parts by weight of the total amount of the modified hydrogenated block copolymer [E] and the hydrogenated block copolymer [D'].

Examples of the UV absorber include an oxybenzophenone-based compound, a benzotriazole-based compound, a salicylate ester-based compound, a benzophenone-based compound, a triazine-based compound and the like.

Examples of the antioxidant include a phosphorus-based antioxidant, a phenol-based antioxidant, a sulfur-based antioxidant and the like.

Examples of the light resistance stabilizer include a hindered amine-based light stabilizer and the like.

In addition, examples of the infrared-shielding agent include metal oxide particulates such as indium-doped tin oxide, antimony-doped tin oxide, zinc oxide and aluminum-doped zinc oxide, and the like.

A method for forming the resin intermediate film is not particularly limited, and a known method such as a melt extrusion method, a coextrusion method, an extrusion laminating method, a heat laminating method, an inflation method, and a calendaring method can be applied.

For example, when a resin intermediate film is formed by a melt extrusion method, the resin temperature may be within a range of normally 200 to 270° C., preferably 210 to 260° C., and more preferably 220 to 250° C.

If the resin temperature is too low, the flowability is deteriorated, and the resulting resin intermediate film is likely to have defects such as orange-peel-like face and die line, and the extrusion speed for the resin intermediate film cannot be increased, resulting in a possibility of industrial disadvantage. If the resin temperature is too high, adhesiveness of the resin intermediate film with the glass becomes poor, or the storage stability of the resin intermediate film decreases, and thus its adhesiveness with the glass after preserving the resin intermediate film under an environment at normal temperature (around 20 to 25° C.) and normal humidity (relative humidity: around 40 to 79%) for a long period possibly decrease.

The thickness of the resin intermediate film is not particularly limited, but is normally in a range of 0.2 to 3.5 mm, preferably 0.5 to 2.5 mm, and more preferably 0.7 to 1.5 mm.

Although a thickness of a resin intermediate film must be increased for maintaining rigidity with a lightweight laminated glass using a thin glass plate, a way of overlapping resin intermediate films having a low thickness per one film rather than a way of increasing the thickness per one resin intermediate film may provide good flexibility and excellent workability when it is laminated with a thin glass plate having a curved shape for automobiles.

A total thickness of the resin interlayer film of the laminated glass in the present invention is appropriately selected depending on a combination with a glass plate to be used in consideration of the rigidity and weight reducing for the laminated glass according to one embodiment of the invention.

When the single resin intermediate film is a multilayered film, the thickness of the layer containing the modified hydrogenated block copolymer [E] is normally 0.01 mm or more, preferably 0.02 mm or more, and more preferably 0.03 mm or more.

If the thickness of the layer containing the modified hydrogenated block copolymer [E] is less than 0.01 mm, its adhesiveness with the glass plate may not be sufficiently obtained.

3. Glass Plate

The laminated glass of the present invention is intended to reduce the weight, and it is preferable to use a thin glass plate. The thickness of the glass plate to be used is normally 0.5 to 1.5 mm, and preferably 0.6 to 1.3 mm. Further, glass plates having different thicknesses e.g. a glass plate with a thickness of 0.7 mm/a resin intermediate film/a glass plate with a thickness of 1.3 mm can be used.

Since the modified hydrogenated block copolymer [E] maintains flexibility in a wide temperature range from a low temperature region of around −50° C. to a high temperature region of around +120° C., at least two glass plates which individually have different thermal expansion coefficients can be bonded together, and thus crack of the glass can be reduced even when the temperature rapidly changes.

The material of the glass plate to be used is not particularly limited, and examples thereof include aluminosilicate glass, aluminoborosilicate glass, uranium glass, potash glass, silicate glass, crystallized glass, germanium glass, quartz glass, soda glass, super white glass, lead glass, barium borosilicate glass, borosilicate glass and the like.

Further, a heat ray-reflecting glass whose surface has an ultrathin metal film or metal oxide film, an infrared-reflecting glass, a colored glass and the like can be used. A float glass, a thermally tempered glass, a chemically strengthened glass and the like for general purpose can also be used depending on production methods.

4. Laminated Glass

The laminated glass according to one embodiment of the invention includes at least two glass plates and the aforementioned resin intermediate film inserted to the bonding surface between these glass plates.

When the total thickness of the laminated glass according to one embodiment of the invention is defined as t and the thickness of the resin intermediate film is defined as $t_R$, t is 3.5 mm or more, and the ratio of $t_R$ to t ($t_R/t$) is normally 20 to 80%, preferably 30 to 70%, and more preferably 40 to 60%.

In cases where the ratio ($t_R/t$) of the thickness of the resin intermediate film is lower than 20% and where higher than 80%, an effect for reducing the weight per unit area possibly decreases when the rigidity of the laminated glass is maintained.

The laminated glass according to one embodiment of the invention can maintain a rigidity equal to or higher than that of general laminated glasses and reduce the weight per unit area to about ⅔ or less.

The laminated glass according to one embodiment of the invention has a low weight per unit area. The weight per unit area of the laminated glass according to one embodiment of the invention is normally 7.5 kg/m² or lower, preferably 7.0 kg/m² or lower, and more preferably 6.5 kg/m² or lower.

The weight per unit area of the laminated glass can be determined by methods described in Examples.

The rigidity of the laminated glass is a value represented by a bending deflection measured using a laminated glass test piece having a length of 100 mm, a width of 20 mm and a thickness of 2 to 5 mm in accordance with the JIS R1602 method (4-point bending test) at a temperature of 90° C. The bending deflection of the laminated glass can be determined by the equation (1).

$$\text{Bending deflection} = (P_2 - P_1)/(y_2 - y_1)/w = 27/(5 \times 1^3) \cdot t^3 E \quad (1)$$

(In the equation, $P_x$ is a load applied at the displacement magnitude x on the load point, $y_x$ is a displacement magnitude on the load point, w is a width of the test piece, 1 is a distance between the supporting rolls, t is a thickness of the test piece, E is an elastic modulus by 4-point bending.)

Equation (1) shows that when the distance between the supporting rolls in the bending test is made constant, the bending deflection of the laminated glass depends on the thickness and the bending modulus of the test piece.

The laminated glass according to one embodiment of the invention is excellent in impact resistance. The excellent impact resistance of the laminated glass according to one embodiment of the invention can be confirmed from e.g. a fact that when a test piece of the laminated glass prepared by inserting the resin intermediate film between two blue glass plates having a thickness of 0.5 to 1.5 mm, a width of 300 mm and a length of 300 mm and integrally adhering them is used and a 227 g steel ball is dropped from a prescribed height onto the test piece in accordance with JIS R3212 method (automotive safety glass test method), the steel ball does not pierce and the total weight of the glass fragments is 12 g or less. Note that the height for dropping the steel ball to the test piece previously preserved at a temperature of −20° C. for 4 hours is 8.5 m, and the height for dropping the steel ball to the test piece previously preserved at a temperature of 40° C. for 4 hours is 9 m.

The laminated glass according to one embodiment of the invention is excellent in heat resistance. The excellent heat resistance of the laminated glass according to one embodiment of the invention can be confirmed from e.g. a fact that a test piece of the laminated glass prepared by inserting the resin intermediate film between two blue glass plates having a thickness of 0.5 to 1.5 mm, a width of 300 mm and a length of 300 mm and integrally adhering them is immersed in boiling water at 100° C. in a vertical state in accordance with JIS R3212 method, preserved for two hours, and then its appearance is observed, and as a result, foaming and other defects are not observed in an area more than 15 mm distant from the edge of the test piece.

The laminated glass according to one embodiment of the invention is excellent in moisture resistance. The excellent moisture resistance of the laminated glass according to one embodiment of the invention can be confirmed from e.g. a fact that a test piece of the laminated glass prepared by inserting the resin intermediate film between two blue glass plates having a thickness of 0.5 to 1.5 mm, a width of 300 mm and a length of 300 mm and integrally adhering them is preserved in a thermohygrostat bath at a temperature of 50° C. under a relative humidity of 95% RH for two weeks in accordance with JIS R3212 method, then change of its appearance is visually evaluated, and as a result, any change (discoloration, foaming, peeling, turbidity, etc.) is not observed in an area more than 10 mm distant from the edge of the test piece.

As a layer structure of the laminated glass according to one embodiment of the invention, a structure in which a glass plate is placed on the outermost layer e.g. a three-layer structure of glass plate/resin intermediate film/glass plate; a five-layer structure such as glass plate/resin intermediate film/transparent resin film/resin intermediate film/glass plate, and glass plate/resin intermediate film/glass plate/resin intermediate film/glass plate; a seven-layer structure of glass plate/resin intermediate film/glass plate/resin intermediate film/glass plate/resin intermediate film/glass plate; and the like is preferred. Since the glass layer is placed on the outermost layer, the abrasion resistance required for an automotive laminated glass can be maintained.

Examples of the transparent resin film include a film including polyester, polyamide, polyolefin, polycarbonate, acrylic resin, fluororesin or the like.

In addition, when the laminated glass has a plurality of resin intermediate films, each of the plural resin interlayers may be the same as or different from each other.

In order to produce the laminated glass according to one embodiment of the invention, a method in which the glass plate and the resin intermediate film are alternately overlapped and adhered with each other under heating and depressurization using a vacuum laminator, a method in which components are put in a heat-resistant resin bag capable of depressurization, the bag is degasified, and then the components are adhered with each other under heating and pressurization using an autoclave, and the like can be applied.

The resin intermediate film and the glass plate used in the present invention can be strongly adhered with each other by press-bonding at normally temperatures of 120 to 180° C., preferably 130 to 160° C., and more preferably 135 to 150° C.

Since the laminated glass according to one embodiment of the invention maintains its rigidity and is lightweight and excellent in heat resistance, light resistance, moisture resistance and the like, it is useful as not only an automotive window material and roof material, but also a window material, roof material and floor material for buildings, a window material for electric cars, a sound insulation window material, a heat insulation window material, a window material for ships and aircrafts, an observation deck material, a surface protection material for liquid crystal displays, organic EL displays and the like, a window material for platform doors, a sound barrier for road, a surface protection cover for solar cells, a protective cover for lighting equipments, and the like.

EXAMPLES

The present invention will be further described by way of Examples in detail, but the present invention is not limited only to the following examples. Note that the units "parts" and "%" respectively refer to "parts by weight" and "wt %" unless otherwise indicated.

The evaluation in this example was carried out in accordance with the following method.
(1) Weight Average Molecular Weight (Mw) and Molecular Weight Distribution (Mw/Mn)

The molecular weights of the block copolymer and the hydrogenated block copolymer were measured as a value expressed in terms of standard polystyrene determined by GPC by using a THF as a solvent at 38° C. As a measuring apparatus, HLC8020GPC manufactured by Tosoh Corporation was used.
(2) Hydrogenation Ratio The hydrogenation ratios of the main chain, the side chain and the aromatic ring of the hydrogenated block copolymer [D] were calculated by measuring the $^1$H-NMR spectrum.
(3) Storage Elastic Modulus of Resin Intermediate Film (G')

A sheet having a length of 70 mm and a width of 10 mm collected from the resin intermediate film was used as a test piece.

The viscoelastic spectrum was measured by using a viscoelasticity measuring device (ARES, manufactured by TA Instruments Japan Inc.) under a condition of angular frequency: 1 rad/s, measurement temperature range: −100 to +130° C., and increase rate: 5° C./min in accordance with JIS K7244-2 method (torsion pendulum method). G' values of the resin intermediate film at −20° C. and +90° C. were determined from the resulting viscoelastic spectrum.
(4) Bending Deflection of Laminated Glass A laminated glass (total thickness: 3.0 to 6.0 mm) prepared by bonding two glass plates (length: 100 mm, width: 20 mm, thickness: 0.5 to 1.5 mm) through an intermediate film was used as a test piece.

By means of an autograph (INSTRON5582, manufactured by INSTRON) equipped with a heating oven, a bending test was carried out using a rotation-type 4-point bending test jig under two conditions of inter-fulcrum distance: upper part=27 mm and lower part=81 mm, diameter of support rod: 6 mm, and temperatures: 25° C. and 90° C. in accordance with JIS R1602 method (4-point bending test), and a value of bending deflection was calculated by the following equation (1).

$$\text{Bending deflection}=(P_2-P_1)/(y_2-y_1)/w=27/(5\times 1^3)\cdot t^3 E \qquad (1)$$

[In the equation, $P_x$ is a load applied at the displacement magnitude x on the load point (unit: N), $y_x$ is a displacement magnitude on the load point (unit: mm), w is a width of the test piece (unit: mm), 1 is a distance between the supporting rolls (unit: mm), t is a thickness of the test piece (unit: mm), and E is an elastic modulus by 4-point bending (unit: MPa).]
(5) Weight Per Unit Area of the Laminated Glass A laminated glass prepared by inserting the resin intermediate film between two blue glass plates having a thickness of 0.5 to 1.5 mm, a width of 300 mm, and a length of 300 mm and integrally adhering them was used as a test piece. The weight of the test piece was measured using an electronic balance to calculate the weight per unit area (unit: kg/m$^2$).
(6) Impact Resistance of the Laminated Glass A laminated glass prepared by inserting the resin intermediate film between two blue glass plates having a thickness of 0.5 to 1.5 mm, a width of 300 mm, and a length of 300 mm and integrally adhering them was used as a test piece.

This test piece was used, and a 227 g steel ball was dropped from a prescribed height onto the test piece in accordance with JIS R3212 method (automotive safety glass test method) to measure presence or absence of piercing and a total weight of glass fragments peeled from an opposite side of the impacted face. The height for dropping the steel ball to the test piece previously preserved at a temperature of −20° C. for 4 hours was 8.5 m, and the height for dropping the steel ball to the test piece previously preserved at a temperature of 40° C. for 4 hours was 9 m.

In evaluation, a case where there was no piercing of the steel ball and the total weight of the glass fragments was 12 g or less was rated as "Good", and a case where there was piercing or a case where there was no piercing but the total weight of the glass fragments was more than 12 g was rated as "Bad".
(7) Heat Resistance of the Laminated Glass A laminated glass prepared by inserting the resin intermediate film between two blue glass plates having a thickness of 0.5 to 1.5 mm, a width of 300 mm, and a length of 300 mm and integrally adhering them was used as a test piece.

This test piece was immersed in boiling water at 100° C. in a vertical state in accordance with JIS R3212 method, preserved for two hours, and then change of its appearance was visually evaluated.

In evaluation, a case where foaming and other defects were not observed in an area more than 15 mm distant from the edge of the test piece was rated as "Good", and a case where foaming and other defects were observed in an area more than 15 mm distant from the edge of the test piece was rated as "Bad".
(8) Moisture Resistance of the Laminated Glass A laminated glass prepared by inserting the resin intermediate film between two blue glass plates having a thickness of 0.5 to 1.5 mm, a width of 300 mm, and a length of 300 mm and integrally adhering them was used as a test piece.

This test piece was preserved in a thermohygrostat bath at a temperature of 50° C. under a relative humidity of 95% RH for two weeks in accordance with JIS R3212 method, and then change of its appearance was visually evaluated.

In evaluation, a case where any change (discoloration, foaming, peeling, turbidity, etc.) was not observed in an area more than 10 mm distant from the edge of the test piece was rated as "Good", and a case where the changes were observed in an area more than 10 mm distant from the edge of the test piece was rated as "Bad".

Production Example 1

Production of Modified Hydrogenated Block Copolymer [E-1]

320 parts of dehydrated cyclohexane, 25.0 parts of dehydrated styrene and 0.475 part of di-n-dibutyl ether were put in a reactor equipped with a stirrer whose inside had been sufficiently replaced by nitrogen, to which 0.85 part of cyclohexane solution containing 15% of n-butyllithium was added while stirring the whole content at 60° C. to start polymerization, and furthermore the reaction was continued while stirring at 60° C. for 60 minutes. At this time, as a result of analyzing the reaction solution by gas chromatography (GC), the polymerization conversion ratio was 99.5%.

Subsequently, 50.0 parts of dehydrated isoprene was added to the reaction solution, and the stirring was continued at 60° C. for 30 minutes. At this time, as a result of analyzing the reaction solution by GC, the polymerization conversion ratio was 99.5%. Subsequently, 25.0 parts of dehydrated styrene was further added to the reaction solution, and stirred at 60° C. for 60 minutes. At this time, as a result of analyzing the reaction solution by GC, the polymerization conversion ratio was nearly 100%. Herein, 0.5 part of isopropyl alcohol was added to terminate the reaction, to obtain a polymer solution.

The block copolymer [C-1] contained in the polymerization solution had a weight average molecular weight (Mw) of 48,400 and a molecular weight distribution (Mw/Mn) of 1.04, and wA:wB was 50:50.

Subsequently, the polymer solution was transferred to a pressure-resistant reactor equipped with a stirrer, to which 8.0 parts of diatomaceous earth-supported nickel catalyst (product name: "E22U", amount of nickel: 60%, manufactured by JGC Catalysts and Chemicals Ltd.) as a hydrogenation catalyst and 100 parts of dehydrated cyclohexane were added, and mixed. The inside of the reactor was replaced by hydrogen gas, to which hydrogen was further fed while stirring the solution, and hydrogenation reaction was continued at a temperature of 190° C. under a pressure of 4.5 MPa for 6 hours. The hydrogenated block copolymer [D-1] contained in the reaction solution obtained by the hydrogenation reaction had a weight average molecular weight (Mw) of 51,200, and a molecular weight distribution (Mw/Mn) of 1.06.

After completion of the hydrogenation reaction, the reaction solution was filtered to remove the hydrogenation catalyst, and then 2.0 parts of xylene solution prepared by dissolving 0.1 part of pentaerythrityl tetrakis[3-(3,5-di-t-butyl-4-hydroxyphenyl)propionate] (product name: "Songnox 1010", manufactured by Matsubarasangyo K.K.) as a phenol-based antioxidant was added to the filtrate, and dissolved.

Subsequently, the above solution was filtered through a metal fiber filter (pore diameter: 0.4 μm, manufactured by NICHIDAI CO., LTD.) to remove fine solid contents, and then cyclohexane, xylene and other volatile components as solvents were removed from the solution using a cylindrical concentration dryer (product name: "Kontro", manufactured by Hitachi, Ltd.) at a temperature of 260° C. under a pressure of 0.001 MPa or lower. The molten polymer was extruded from the die in a strand form, cooled, and then 95 parts of pellet of the hydrogenated block copolymer [D-1] was produced by a pelletizer.

The resulting pelletized hydrogenated block copolymer [D-1] had a weight average molecular weight (Mw) of 50,700, a molecular weight distribution (Mw/Mn) of 1.10, and a hydrogenation ratio of nearly 100%.

To 100 parts of the resulting pellet of the hydrogenated block copolymer [D-1], 2.0 parts of vinyltrimethoxysilane and 0.2 part of 2,5-dimethyl-2,5-di(t-butylperoxy)hexane (product name: "PERHEXA (registered trademark) 25B" manufactured by NOF CORPORATION) were added. This mixture was kneaded using a twin-screw extruder at a resin temperature of 200° C. with a detention time of 60 to 70 seconds, extruded in a strand form, air-cooled, and then cut by a pelletizer to obtain 96 parts of pellet of the modified hydrogenated block copolymer [E-1] having an alkoxysilyl group.

10 parts of the resulting pellet of the modified hydrogenated block copolymer [E-1] was dissolved in 100 parts of cyclohexane, then poured into 400 parts of dehydrated methanol to coagulate the modified hydrogenated block copolymer [E1], and the coagulate was taken by filtration. The filtrate was vacuum-dried at 25° C. to isolate 9.0 parts of crumb of the modified hydrogenated block copolymer [E-1]. As results of measuring FT-IR spectra for the modified hydrogenated block copolymer [E-1], a new absorption band attributed to a Si—$OCH_3$ group was observed at 1090 $cm^{-1}$ and new absorption bands attributed to a Si—$CH_2$ group were observed at 825 $cm^{-1}$ and 739 $cm^{-1}$, i.e. they were observed at areas other than the absorption bands attributed to the Si—$OCH_3$ group and the Si—$CH_2$ group of vinyltrimethoxysilane (1075 $cm^{-1}$, 808 $cm^{-1}$, and 766 $cm^{-1}$).

Furthermore, as a result of measuring the $^1$H-NMR spectrum (in deuterated chloroform) of the modified hydrogenated block copolymer [E-1], a peak attributed to a proton of a methoxy group was observed at 3.6 ppm, and it was confirmed from the peak area ratio that 1.8 parts of vinyltrimethoxysilane bound to 100 parts of the hydrogenated block copolymer [D-1].

Production Example 2

Production of Modified Hydrogenated Block Copolymer [E-2]

The polymerization reaction and the reaction-terminating operation were carried out in the same manner as Production Example 1, except that 20.0 parts of styrene, 60.0 parts of isoprene and 20.0 parts of styrene were respectively added in this order in three additions and the amount of the n-butyllithium (15% cyclohexane solution) was changed to 0.80 part in Production Example 1.

The resulting block copolymer [C-2] had a weight average molecular weight (Mw) of 51,200 and a molecular weight distribution (Mw/Mn) of 1.04, and wA:wB was 40:60.

Subsequently, the polymer solution was subjected to hydrogenation reaction in the same manner as Production Example 1. The hydrogenated block copolymer [D-2] after hydrogenation reaction had a weight average molecular weight (Mw) of 54,200 and a molecular weight distribution (Mw/Mn) of 1.06.

After completion of the hydrogenation reaction, an antioxidant was added in the same manner as in Production Example 1, and then concentrated and dried to obtain 92 parts of pellet of the hydrogenated block copolymer [D-2].

The resulting pelletized hydrogenated block copolymer [D-2] had a weight average molecular weight (Mw) of 53,700, a molecular weight distribution (Mw/Mn) of 1.11 and a hydrogenation ratio of nearly 100%.

The resulting pellet of the hydrogenated block copolymer [D-2] was used to obtain 95 parts of pellet of the modified hydrogenated block copolymer [E-2] having an alkoxysilyl group in the same manner as Production Example 1.

The resulting modified hydrogenated block copolymer [E-2] was analyzed in the same manner as Production Example 1, and it was confirmed that 1.8 parts of vinyltrimethoxysilane bound to 100 parts of the hydrogenated block copolymer [D-2].

Production Example 3

Production of Hydrogenated Block Copolymer [D'-3]

The polymerization reaction and the reaction-terminating operation were carried out in the same manner as Production Example 1, except that 30.0 parts of styrene, 40.0 parts of isoprene and 30.0 parts of styrene were respectively added in this order in three additions and the amount of the n-butyllithium (15% cyclohexane solution) was changed to 0.75 part in Production Example 1.

The resulting block copolymer [C'-3] had a weight average molecular weight (Mw) of 55,600 and a molecular weight distribution (Mw/Mn) of 1.04, and wA:wB was 60:40.

Subsequently, the polymer solution was subjected to hydrogenation reaction in the same manner as Production Example 1. The hydrogenated block copolymer [D'-3] after hydrogenation reaction had a weight average molecular weight (Mw) of 58,900 and a molecular weight distribution (Mw/Mn) of 1.06.

After completion of the hydrogenation reaction, an antioxidant was added in the same manner as in Production Example 1, and then concentrated and dried to obtain 92 parts of pellet of the hydrogenated block copolymer [D'-3]. The resulting pelletized block copolymer [D'-3] had a weight average molecular weight (Mw) of 58,300, a molecular weight distribution (Mw/Mn) of 1.10 and a hydrogenation ratio of nearly 100%.

Production Example 4

Production of Hydrogenated Block Copolymer [D'-4]

The polymerization reaction and the reaction-terminating operation were carried out in the same manner as Production Example 1, except that 40.0 parts of styrene, 20.0 parts of isoprene and 40.0 parts of styrene were respectively added in this order in three additions and the amount of the n-butyllithium (15% cyclohexane solution) was changed to 0.65 part in Production Example 1.

The resulting block copolymer [C'-4] had a weight average molecular weight (Mw) of 71,400 and a molecular weight distribution (Mw/Mn) of 1.04, and wA:wB was 80:20.

Subsequently, the polymer solution was subjected to hydrogenation reaction in the same manner as Production Example 1. The hydrogenated block copolymer [D'-4] after hydrogenation reaction had a weight average molecular weight (Mw) of 75,700 and a molecular weight distribution (Mw/Mn) of 1.06.

After completion of the hydrogenation reaction, an antioxidant was added in the same manner as in Production Example 1, and then concentrated and dried to obtain 90 parts of pellet of the hydrogenated block copolymer [D'-4]. The resulting pelletized hydrogenated block copolymer [D'-4] had a weight average molecular weight (Mw) of 74,900, a molecular weight distribution (Mw/Mn) of 1.10 and a hydrogenation ratio of nearly 100%.

Production Example 5

Production of sheet [$F_{(E-1)}$]

The pellet of the modified hydrogenated block copolymer [E-1] obtained in Production Example 1 was extruded to form a sheet by using a T die-type film melt extruder (width of the T die: 400 mm) having a twin-screw kneader equipped with a 37 mmφ screw, a cast roll (with an embossing pattern), and an extrusion sheeter equipped with a rubber nip roll and a sheet take-off device. In the forming condition, a temperature of the molten resin was 200° C., a temperature of the T-die was 200° C., and a temperature of the casting roll was 80° C. For the sheets [F(E-1)] including the modified hydrogenated block copolymer [E-1], five types of sheets having a width of 330 mm and thicknesses: [$F_{(E-1)760}$] 760 μm, [$F_{(E-1)380}$] 380 μm, [$F_{(E-1)200}$] 200 μm, [$F_{(E-1)100}$] 100 μm and [$F_{(E-1)50}$] 50 μm were formed. The embossed pattern was transferred to the sheet [$F_{(E-1)}$] by pressing one side of the extruded sheet against the emboss roll by means of the nip roll. The resulting sheet [$F_{(E-1)}$] was wound on a roll and collected.

Production Example 6

Production of Sheet [$F_{(E-2)}$]

The pellet of the modified hydrogenated block copolymer [E-2] obtained in Production Example 2 was sheeted in the same manner as Production Example 5 to produce sheets with thicknesses of 50 to 760 μm: [$F_{(E-2)760}$], [$F_{(E-2)380}$], [$F_{(E-2)200}$], [$F_{(E-2)100}$] and [$F_{(E-2)50}$] including the modified hydrogenated block copolymer[E-2].

Production Example 7

Production of Sheet [$F_{(D-1)}$]

The pellet of the hydrogenated block copolymer [D-1] produced in Production Example 1 was sheeted in the same manner as Production Example 5 to produce sheets with thicknesses of 380 to 760 μm: [$F_{(D-1)760}$] and [$F_{(D-1)380}$] including the hydrogenated block copolymer [D-1].

Production Example 8

Production of Sheet [$F_{(E-2)(D'-3)}$]

65 parts of pellet of the modified hydrogenated block copolymer [E-2] obtained in Production Example 2 was mixed with 35 parts of pellet of the hydrogenated block copolymer [D'-3] produced in Production Example 3. The mixed pellet was sheeted in the same manner as Production Example 5 to produce sheets with thicknesses of 760 to 50 μm: [$F_{(E-2)(D'-3)760}$], [$F_{(E-2)(D'-3)380}$], [$F_{(E-2)(D'-3)200}$], [$F_{(E-2)(D'-3)100}$] and [$F_{(E-2)(D'-3)50}$] including the modified hydrogenated block copolymer [E-2] and the hydrogenated block copolymer [D'-3].

Production Example 9

Production of Sheet [$F_{(E-1)(D'-4)}$]

50 parts of pellet of the modified hydrogenated block copolymer [E-1] obtained in Production Example 1 was mixed with 50 parts of pellet of the hydrogenated block copolymer [D'-4] produced in Production Example 4. The mixed pellet was sheeted in the same manner as Production Example 5 to produce sheets with thicknesses of 760 to 50 µm: [$F_{(E-1)(D'-4)760}$], [$F_{(E-1)(D'-4)380}$], [$F_{(E-1)(D'-4)200}$], [$F_{(E-1)(D'-4)100}$] and [$F_{(E-1)(D'-4)50}$] including the modified hydrogenated block copolymer [E-1] and the hydrogenated block copolymer [D'-4].

Reference Example

A laminated glass prepared by bonding two blue glass plates having a length of 300 mm, a width of 300 mm and a thickness of 2.1 mm to each other through a polyvinyl butyral intermediate film having a thickness of 0.76 mm and a laminated glass prepared by bonding two blue glass plates having a length of 100 mm, a width of 20 mm and a thickness of 2.1 mm to each other through a polyvinyl butyral intermediate film having a thickness of 0.76 mm (manufactured by OSAKA GLASS CO., LTD) were used as test samples.

(Measurement of Weight Per Unit Area for Laminated Glass)

From the weight measurement of this laminated glass test sample, its weight per unit area was calculated to be 11.3 kg/m$^2$.

(Evaluation of Bending Deflection for Laminated Glass)

The bending deflections of this laminated glass test sample were 7.9 N/mm$^2$ at 25° C. and 7.3 N/mm$^2$ at 90° C.

Example 1

The sheets of one [$F_{(E-1)760}$], one [$F_{(E-1)380}$], one [$F_{(E-1)760}$] and one [$F_{(E-1)200}$] prepared in Production Example 5 were laminated and arranged in this order between two blue glass plates having a length of 300 mm, a width of 300 mm and thicknesses of 1.3 mm and 0.7 mm. This laminate was put in a resin bag with a thickness of 75 µm having a layer structure of nylon/adhesive layer/polypropylene, and the laminate was seal-packed by heat-sealing its opening while degassing the bag using a sealed packing machine (BH-951, manufactured by Panasonic Corporation).

Thereafter, the seal-packed laminate was put in an autoclave and treated at a temperature of 140° C. under a pressure of 0.8 MPa for 30 minutes to prepare a laminated glass test piece [$G-1_{300}$] having a layer structure of glass plate/resin intermediate film/glass plate. No defect such as foaming was observed in the appearance of the laminated glass test piece [$G-1_{300}$], and the appearance was good.

(Measurement of Weight Per Unit Area for Laminated Glass)

From the weight measurement of the laminated glass test piece [$G-1_{300}$], its weight per unit area was calculated to be 6.9 kg/m$^2$. This weight was lighter than the laminated glass in Reference Example by 39%.

(Storage Elastic Modulus of Resin Intermediate Film)

A polytetrafluoroethylene release sheet with a thickness of 0.2 mm, the sheets of one [$F_{(E-1)760}$], one [$F_{(E-1)380}$], one [$F_{(E-1)760}$] and one [$F_{(E-1)200}$] prepared in Production Example 5, and a polytetrafluoroethylene release sheet with a thickness of 0.1 mm were laminated and arranged between two blue glass plates having a length of 300 mm, a width of 300 mm and a thickness of 1.3 mm, to prepare a laminated glass under the same condition as described above. The resin intermediate film was separated by removing the glass plates and the polytetrafluoroethylene release sheets from the prepared laminated glass. The resulting resin intermediate film had a thickness of 2.1 mm.

As a result of measuring the viscoelasticity spectrum for this resin intermediate film, its storage elastic moduli (G') were 1.2×10$^8$ Pa at −20° C. and 2.8×10$^7$ Pa at 90° C.

(Evaluation of Bending Deflection for Laminated Glass)

The sheets of one [$F_{(E-1)760}$], one [$F_{(E-1)380}$], one [$F_{(E-1)760}$] and one [$F_{(E-1)200}$] prepared in Production Example 5 were laminated in this order between two blue glass plates having a length of 100 mm, a width of 20 mm and thicknesses of 1.3 mm and 0.7 mm, to prepare a laminated glass test piece [$G-1_{100}$] for bending test under the same condition as described above.

The bending deflections loaded from a side of the 1.3 mm-thick glass of the laminated glass test piece [$G-1_{100}$] were 12.9 N/mm$^2$ at 25° C. and 7.4 N/mm$^2$ at 90° C. This deflection was higher than at 25° C., and almost equal to at 90° C., the bending deflection of the laminated glass in Reference Example.

(Evaluation of Impact Resistance for Laminated Glass)

For a laminated glass test piece [$G-1_{300}$], its impact resistance was evaluated by applying a falling ball impact from the side of the 1.3-mm-thick glass. As a result, a steel ball pierced neither the test piece preserved at −20° C. nor the test piece preserved at 40° C., and the amounts of the glass fragments were 0 to 0.31 g and 0 to 0.48 g respectively.

In evaluation of the impact resistance, both cases of the test pieces preserved at −20° C. and at 40° C. were rated as "Good".

(Evaluation of Heat Resistance for Laminated Glass)

For the laminated glass test piece [$G-1_{300}$], its heat resistance was evaluated. As a result, no change was observed in the appearance of the test piece, and the case was evaluated as "Good".

(Evaluation of Moisture Resistance for Laminated Glass)

For the laminated glass test piece [$G-1_{300}$], its moisture resistance was evaluated. As a result, no change was observed in the appearance of the test piece, and the case was evaluated as "Good".

These evaluation results are shown in Table 1.

Example 2

A laminated glass test piece [$G-2_{300}$] and a laminated glass test piece [$G-2_{100}$] which have a layer structure of glass plate/resin intermediate film/glass plate, and a resin intermediated film (thickness: 1.0 mm) were prepared in the same manner as Example 1 except that two blue glass plates having a thickness of 1.3 mm were used and the sheets of one [$F_{(E-1)760}$], one [$F_{(E-1)50}$] and one [$F_{(E-1)200}$] prepared in Production Example 5 were laminated and arranged in this order.

For these laminated glass test pieces and the resin intermediate film, weights per unit area of the laminated glasses, a storage elastic modulus of the resin intermediate film and bending deflections of the laminated glasses were measured to evaluate the impact resistances, heat resistances and moisture resistances of the laminated glasses in the same manner as Example 1. These evaluation results are shown in Table 1.

Example 3

A laminated glass test piece [$G-3_{300}$] and a laminated glass test piece [$G-3_{100}$] which have a layer structure of glass plate/resin intermediate film/glass plate, and a resin intermediate film (thickness: 3.1 mm) were prepared in the same manner as Example 1 except that two blue glass plates having a thickness of 0.7 mm were used, the sheet $[F_{(E-1)}]$ prepared in Production Example 5 and the sheet $[F_{(D-1)}]$ prepared in Production Example 7 were used, and a sheet structure was constructed so that the sheets of one $[F_{(E-1)2200}]$, one $[F_{(D-1)760}]$, one $[F_{(E-1)200}]$, one $[F_{(D-1)760}]$, one $[F_{(E-1)200}]$, one $[F_{(D-1)760}]$ and one $[F_{(E-1)200}]$ were laminated and arranged in this order.

For these laminated glass test pieces and the resin intermediate film, weights per unit area of the laminated glasses, a storage elastic modulus of the resin intermediate film and bending deflections of the laminated glasses were measured to evaluate the impact resistances, heat resistances and moisture resistances of the laminated glasses in the same manner as Example 1. These evaluation results are shown in Table 1.

Example 4

A laminated glass test piece $[G-4_{300}]$ and a laminated glass test piece $[G-4_{100}]$ which have a layer structure of glass plate/resin intermediate film/glass plate, and a resin intermediate film (thickness: 1.5 mm) were prepared in the same manner as Example 1 except that two blue glass plates having a thickness of 1.1 mm were used, the sheet $[F_{(E-2)(D'-3)}]$ prepared in Production Example 8 was used, and a sheet structure was constructed so that two sheets $[F_{(E-2)(D'-3)760}]$ were laminated and arranged.

For these laminated glass test pieces and the resin intermediate film, weights per unit area of the laminated glasses, a storage elastic modulus of the resin intermediate film and bending deflections of the laminated glasses were measured to evaluate the impact resistances, heat resistances and moisture resistances of the laminated glasses in the same manner as Example 1. These evaluation results are shown in Table 1.

Comparative Example 1

A laminated glass test piece $[G-5_{300}]$ and a laminated glass test piece $[G-5_{100}]$ which have a layer structure of glass plate/resin intermediate film/glass plate, and a resin intermediate film (thickness: 2.3 mm) were prepared in the same manner as Example 1 except that two blue glass plates having a thickness of 0.7 mm were used, and three sheets $[F_{(E-1)760}]$ prepared in Production Example 5 were laminated and arranged.

For these laminated glass test pieces and the resin intermediate film, weights per unit area of the laminated glasses, a storage elastic modulus of the resin intermediate film and bending deflections of the laminated glasses were measured to evaluate the impact resistances, heat resistances and moisture resistances of the laminated glasses in the same manner as Example 1. These evaluation results are shown in Table 1.

Comparative Example 2

A laminated glass test piece $[G-6_{300}]$ and a laminated glass test piece $[G-6_{100}]$ which have a layer structure of glass plate/resin intermediate film/glass plate, and a resin intermediate film (thickness: 2.1 mm) were prepared in the same manner as Example 1 except that two blue glass plates having thicknesses of 1.3 mm and 0.7 mm were used, and the sheets of one $[F_{(E-2)760}]$, one $[F_{(E-2)380}]$, one $[F_{(E-2)760}]$ and one $[F_{(E-2)200}]$ prepared in Production Example 6 were laminated and arranged.

For these laminated glass test pieces and the resin intermediate film, weights per unit area of the laminated glasses, a storage elastic modulus of the resin intermediate film and bending deflections of the laminated glasses were measured to evaluate the impact resistances, heat resistances and moisture resistances of the laminated glasses in the same manner as Example 1. These evaluation results are shown in Table 1.

Comparative Example 3

A laminated glass test piece $[G-7_{300}]$ and a laminated glass test piece $[G-7_{100}]$ which have a layer structure of glass plate/resin intermediate film/glass plate, and a resin intermediate film (thickness: 2.1 mm) were prepared in the same manner as Example 1 except that two blue glass plates having thicknesses of 1.3 mm and 0.7 mm were used, and the sheets of one $[F_{(E-1)760}]$, one $[F_{(E-1)380}]$, one $[F_{(E-1)(D'-4)760}]$ and one $[F_{(E-1)(D'-4)200}]$ prepared in Production Example 9 were laminated and arranged.

For these laminated glass test pieces and the resin intermediate film, weights per unit area of the laminated glasses, a storage elastic modulus of the resin intermediate film and bending deflections of the laminated glasses were measured to evaluate the impact resistances, heat resistances and moisture resistances of the laminated glasses in the same manner as Example 1. These evaluation results are shown in Table 1.

TABLE 1

|  |  |  |  | Example 1 | Example 2 | Example 3 | Example 4 |
|---|---|---|---|---|---|---|---|
|  |  |  | Thickness |  |  |  |  |
|  | First glass |  | mm | 1.3 | 1.3 | 0.7 | 1.1 |
| Resin | [E-1] |  | mm | 2.1 | 1 | 0.8 | — |
| intermediate | [E-2] |  | mm | — | — | — | — |
| film | [D-1] |  | mm | — | — | 2.3 | — |
|  | [E-2]:[D'-3] = 65:35 |  | mm | — | — | — | 1.5 |
|  | [E-1]:[D'-4] = 50:50 |  | mm | — | — | — | — |
|  | Second glass |  | mm | 0.7 | 1.3 | 0.7 | 1.1 |
|  |  |  | Unit |  |  |  |  |
| Thickness of resin intermediate film | | $t_R$ | mm | 2.1 | 1 | 3.1 | 1.5 |
| Thickness of laminated glass | | t | mm | 4.1 | 3.6 | 4.5 | 3.7 |
| Ratio of thicknesses of resin intermediate film to laminated glass | | $t_R/t$ | % | 51% | 28% | 69% | 41% |
| Storage elastic modulus of | | −20° C. | Pa | $1.2 \times 10^8$ | $1.2 \times 10^8$ | $1.3 \times 10^8$ | $1.5 \times 10^8$ |
| resin intermediate film | | 90° C. | Pa | $2.8 \times 10^7$ | $2.8 \times 10^7$ | $3.8 \times 10^7$ | $4.2 \times 10^7$ |

TABLE 1-continued

| | | | | | | |
|---|---|---|---|---|---|---|
| Weight per unit area of laminated glass | | kg/m² | 6.9 | 7.4 | 6.3 | 6.9 |
| Bending deflection of | 25° C. | N/mm² | 12.9 | 12.4 | 13.1 | 14.1 |
| laminated glass | 90° C. | N/mm² | 7.4 | 8 | 7.5 | 7.4 |
| Impact resistance of | −20° C. | — | Good | Good | Good | Good |
| laminated glass | 40° C. | — | Good | Good | Good | Good |
| Heat resistance of laminated glass | | — | Good | Good | Good | Good |
| Moisture resistance of laminated glass | | — | Good | Good | Good | Good |

| | | | | Comparative example 1 | Comparative example 2 | Comparative example 3 | Reference |
|---|---|---|---|---|---|---|---|
| | | | Thickness | | | | |
| First glass | | | mm | 0.7 | 1.3 | 1.3 | 2.1 |
| Resin intermediate film | [E-1] | | mm | 2.3 | — | — | — |
| | [E-2] | | mm | — | 2.1 | — | — |
| | [D-1] | | mm | — | — | — | — |
| | [E-2]:[D'-3] = 65:35 | | mm | — | — | — | — |
| | [E-1]:[D'-4] = 50:50 | | mm | — | — | 2.1 | — |
| Second glass | | | mm | 0.7 | 0.7 | 0.7 | 2.1 |
| | | | Unit | | | | |
| Thickness of resin intermediate film | $t_R$ | | mm | 2.3 | 2.1 | 2.1 | 0 |
| Thickness of laminated glass | t | | mm | 3.7 | 4.1 | 4.1 | 4.2 |
| Ratio of thicknesses of resin intermediate film to laminated glass | $t_R/t$ | | % | 62% | 51% | 51% | 0% |
| Storage elastic modulus of | −20° C. | | Pa | $1.2 \times 10^8$ | $7.4 \times 10^7$ | $6.1 \times 10^8$ | — |
| resin intermediate film | 90° C. | | Pa | $2.8 \times 10^7$ | $1.7 \times 10^7$ | $7.4 \times 10^7$ | — |
| Weight per unit area of laminated glass | | | kg/m² | 5.6 | 6.9 | 6.9 | 11.3 |
| Bending deflection of | 25° C. | | N/mm² | 8.1 | 8.5 | 13.5 | 7.9 |
| laminated glass | 90° C. | | N/mm² | 4.2 | 4.9 | 7.8 | 7.3 |
| Impact resistance of | −20° C. | | — | Good | Good | Bad | — |
| laminated glass | 40° C. | | — | Good | Good | Bad | — |
| Heat resistance of laminated glass | | | — | Good | Good | Good | — |
| Moisture resistance of laminated glass | | | — | Good | Good | Good | — |

The results of Examples and Comparative Examples indicate the followings.

When the storage elastic modulus of the resin intermediate film containing the modified hydrogenated block copolymer [E] is within the scope of the present invention, a laminated glass in which a rigidity is maintained at a temperature as high as 90° C. and the weight per unit area is reduced to about ⅔ or less compared to a general laminated glass using PVB as an intermediate film can be obtained by selecting a thickness of the glass plate and a thickness of the resin intermediate film. Further, it has impact resistance, heat resistance and moisture resistance required for automotive safety glasses (Examples 1 to 4).

Furthermore, where both thicknesses of the Glass plate and the resin intermediate film are decreased, and thereby the laminated glass is too thinned and too lightened (Comparative Example 1), the rigidity at a high temperature cannot be sufficiently maintained in a case, even when the storage elastic modulus of the resin intermediate film containing the modified hydrogenated block copolymer [E] is within the scope of the present invention.

In the lightweight laminated glass using a resin intermediate film having the low storage elastic modulus at high temperature, the rigidity at high temperature (90° C.) cannot be maintained compared to a general laminated glass using a thick glass plate (Comparative Example 2).

In the lightweight laminated glass using the resin intermediate film in which the storage elastic modulus at high temperature is high but the storage elastic modulus at low temperature (−20° C.) is also too increased, the rigidity at high temperature can be maintained but the impact resistance is inferior (Comparative Example 3).

INDUSTRIAL APPLICABILITY

The laminated glass according to one embodiment of the invention maintains the rigidity, reduces the weight per unit area compared to a general laminated glass, is excellent in heat resistance, impact resistance, light resistance, moisture resistance and the like, and useful as a window material for automobiles, a window material, roof material or floor material for buildings, a window material for ships and aircrafts, and the like.

The invention claimed is:

1. A laminated glass which is prepared by inserting a resin intermediate film between glass plates and adhering the glass plates to integrate them,
    wherein the laminated glass has a bending deflection at 90° C. of 7.3 N/mm² or higher and a weight per unit area of 7.5 kg/m² or less,
    wherein the bending deflection is measured by bonding two glass plates each having a length of 100 mm, a width of 20 mm and a thickness of 0.5 mm to 1.5 mm through the resin intermediate film to form a test piece, subjecting the test piece to a 4-point bending test in accordance with JIS R1602 method, and calculating the bending deflection by equation (1):

$$\text{Bending deflection} = (27/(5 \times L^3)) \times t^3 E \quad (1)$$

wherein L is a distance between supporting rolls of the 4-point bending test in mm, t is a thickness of the test piece in mm, and E is an elastic modulus of the test piece measured by the 4-point bending test in MPa;
    wherein the resin intermediate film:
        contains a mixture of:
            a modified hydrogenated block copolymer [E] obtained by introducing an alkoxysilyl group into a hydrogenated block copolymer [D], and
            a hydrogenated block copolymer [D'] having a higher storage elastic modulus at a temperature of 90° C. than that of the hydrogenated block copolymer [D]; or is a multilayer comprising:
- a first layer including the modified hydrogenated block copolymer [E], and
- a second layer including the hydrogenated block copolymer [D] and/or the hydrogenated block copolymer [D'], wherein the first layer and the second layer are alternately laminated, wherein storage elastic moduli measured via dynamic viscoelasticity of the resin intermediate film are $5 \times 10^8$ Pa or lower at a temperature of $-20°$ C. and $3 \times 10^7$ Pa or higher at a temperature of $90°$ C., wherein the hydrogenated block copolymer [D] is obtained by hydrogenating 90% or more of carbon-carbon unsaturated bonds on a main chain and side chains and carbon-carbon unsaturated bonds on an aromatic ring in a block copolymer [C] which contains at least two polymer blocks [A] containing 95 wt % or more of a structural unit derived from an aromatic vinyl compound and at least one polymer block [B] containing 80 wt % or more of a structural unit derived from an acyclic conjugated diene compound, wherein a ratio (wA:wB) of a weight fraction (wA) of the polymer block [A] to a weight fraction (wB) of the polymer block [B] is 40:60 to 60:40, wherein the hydrogenated block copolymer [D'] is obtained by hydrogenating 90% or more of carbon-carbon unsaturated bonds on a main chain and side chains and carbon-carbon unsaturated bonds on an aromatic ring in a block copolymer [C'] which contains at least two polymer blocks [A'] containing 95 wt % or more of a structural unit derived from an aromatic vinyl compound and at least one polymer block [B'] containing 80 wt % or more of a structural unit derived from an acyclic conjugated diene compound, wherein a ratio (wA':wB') of a weight fraction (wA') of the polymer block [A'] to a weight fraction (wB') of the polymer block [B'] is 50:50 to 70:30, wherein the modified hydrogenated block copolymer [E] includes the alkoxysilyl group introduced into the hydrogenated block copolymer [D] in an amount of 0.1 to 10 parts by weight of the alkoxysilyl group based on 100 parts of the hydrogenated block copolymer [D], wherein a content of the modified hydrogenated block copolymer [E] in the resin intermediate film is 26 wt % or more, and wherein a ratio ($t_R/t$) of a thickness of the resin intermediate film ($t_R$) in the laminated glass to a total thickness of the laminated glass (t) 20 to 80%.

2. The laminated glass according to claim 1, wherein the resin intermediate film contains the mixture of the modified hydrogenated block copolymer [E] and the hydrogenated block copolymer [D'].

3. The laminated glass according to claim 1, wherein the resin intermediate film is the multilayer comprising the first layer including the modified hydrogenated block copolymer [E], and the second layer including the hydrogenated block copolymer [D] and/or the hydrogenated block copolymer [D'], wherein the first layer and the second layer are alternately laminated.

* * * * *